(12) United States Patent
Uemura et al.

(10) Patent No.: US 6,522,055 B2
(45) Date of Patent: Feb. 18, 2003

(54) ELECTRON-EMITTING SOURCE, ELECTRON-EMITTING MODULE, AND METHOD OF MANUFACTURING ELECTRON-EMITTING SOURCE

(75) Inventors: Sashiro Uemura, Mie (JP); Takeshi Nagasako, Mie (JP); Junko Yotani, Mie (JP); Hirohiko Murakami, Mie (JP)

(73) Assignees: Novitake Itron Corporation (JP); Nihon Shinku Gijutsu Kabushiki Kaisha (JP)

( * ) Notice: Subject to any disclaimer, the term of this patent is extended or adjusted under 35 U.S.C. 154(b) by 46 days.

(21) Appl. No.: 09/784,868

(22) Filed: Feb. 15, 2001

(65) Prior Publication Data

US 2001/0028209 A1 Oct. 11, 2001

(30) Foreign Application Priority Data

Feb. 16, 2000 (JP) ........................ 2000-037672

(51) Int. Cl.[7] .................. H01J 1/304; H01J 9/02; H01J 29/46
(52) U.S. Cl. .................. 313/310; 313/311; 313/495; 313/309
(58) Field of Search ................ 313/310, 311, 313/309, 336, 351, 495, 497

(56) References Cited

U.S. PATENT DOCUMENTS

| | | | | |
|---|---|---|---|---|
| 6,097,138 A | * | 8/2000 | Nakamoto | 313/309 |
| 6,239,547 B1 | * | 5/2001 | Uemura et al. | 313/495 |
| 6,339,281 B2 | * | 1/2002 | Lee et al. | 313/309 |
| 6,250,984 B1 | * | 6/2002 | Jin et al. | 313/495 |

FOREIGN PATENT DOCUMENTS

| | | |
|---|---|---|
| EP | 0 905 737 A | 3/1999 |
| EP | 0 913 508 A | 5/1999 |
| EP | 0 951 047 A | 10/1999 |
| WO | WO 99 65821 A | 12/1999 |
| WO | WO 00 52726 A | 9/2000 |

OTHER PUBLICATIONS

Jemura et al., "Carbon Nanotube FED Elements", SID 1998 Digest, pp. 1052–1055.
Patent Abstract of Japan vol. 2000, No. 06, Sep. 22, 2000 & JP 2000 086216 A (Toshiba Corp), Mar. 28, 2000 abstract.
Qin L C et al: "Growing Carbon Nanotubes by Microwave Plasma–Enhanced Chemical Vapor Deposition" Applied Physics Letters, American Institute of Physics, New York, US vol. 72, No. 26, Jun. 29, 1998, pp. 3437–3439, XP000771159 ISSN: 0003–6951.
Cui H et al: "Aligned Carbon Nanotubes via Microwave Plasma Enhanced Chemical Vapor Deposition" Materials Research Society Symposium Proceedings, Nov. 29, 1999, XP000961478.

* cited by examiner

*Primary Examiner*—Sandra O'Shea
*Assistant Examiner*—Bao Q. Truong
(74) *Attorney, Agent, or Firm*—Blakely Sokoloff Taylor & Zafman (57) ABSTRACT

An electron-emitting source includes a substrate and a coating film. The substrate is made of a material containing a metal serving as a growth nucleus for nanotube fibers as a main component, and has a plurality of through holes. The coating film is constituted by nanotube fibers formed on a surface of the substrate and wall surfaces of the through holes. A method of manufacturing an electron-emitting source is also disclosed.

11 Claims, 6 Drawing Sheets

ELECTRON-EMITTING SOURCE, ELECTRON-EMITTING MODULE, AND METHOD OF MANUFACTURING ELECTRON-EMITTING SOURCE

BACKGROUND OF THE INVENTION

The present invention relates to an electron-emitting source and, more particularly, to a field emission type electron-emitting source in which electron emission uniformity is improved, an electron-emitting module, and a method of manufacturing an electron-emitting source.

In recent years, a field emission type electron-emitting source using carbon nanotubes attracts attention as an electron-emitting source in a fluorescent display device such as an FED (Field Emission Display) or vacuum fluorescent display. In a carbon nanotube, a graphite single layer is cylindrically closed, and a 5-membered ring is formed at the distal end of the cylinder. Since the carbon nanotube has a typical diameter of as very small as 10 nm to 50 nm, upon application of an electric field of about 100 V, it can field-emit electrons from its distal end. Carbon nanotubes are classified into those with a single-layered structure described above and those with a coaxial multilayered structure in which a plurality of graphite layers stacked to form a telescopic structure are cylindrically closed. Either carbon nanotube can be used to form an electron-emitting source.

A field emission type electron-emitting source using conventional typical carbon nanotubes is formed of a flat substrate electrode in which many carbon nanotubes are arranged. When a high voltage is applied across this substrate electrode and a mesh-like electron extracting electrode opposing it, the electric field is concentrated to the distal ends of the carbon nanotubes to emit electrons from there. For this purpose, it is desirable that the carbon nanotubes on the substrate electrode have distal ends perpendicular to the substrate surface. If the electron emission uniformity is poor, luminance nonuniformity occurs. Therefore, it is desirable that the carbon nanotubes are uniformly arranged on the substrate electrode.

To form such an electron-emitting source, a method of forming carbon nanotubes directly on a flat substrate by using CVD (Chemical Vapor Deposition) is proposed. According to this method, an electron-emitting source made up of carbon nanotubes extending perpendicularly from the substrate surface and formed uniformly on the substrate can be manufactured.

In the conventional electron-emitting source obtained by directly forming carbon nanotubes on the substrate surface, however, a discontinuous portion such as a projection or recess sometimes exists. In this case, if a parallel electric field is applied to obtain field electron emission, the electric field is concentrated to the discontinuous portion to cause local electron emission, leading to a luminance nonuniformity on the fluorescent display device.

When the field strength is increased to improve the luminance, an electron-emitting density of a local portion exceeds the allowable limit to break this local portion, and a new field concentrated portion is formed around the broken portion. Consequently, breakdown occurs in a chain manner. This is the largest issue in actually applying field electron emission to a fluorescent display device.

SUMMARY OF THE INVENTION

It is an object of the present invention to provide an electron-emitting source which can obtain uniform field electron emission with a high current density, an electron-emitting module, and a method of manufacturing an electron-emitting source.

It is another object of the present invention to provide an electron-emitting source which does not cause a breakdown chain when the field strength is increased, an electron-emitting module, and a method of manufacturing an electron-emitting source.

In order to achieve the above objects, according to the present invention, there is provided an electron-emitting source comprising a substrate made of a material containing a metal serving as a growth nucleus for nanotube fibers as a main component and having a plurality of through holes, and a coating film constituted by nanotube fibers formed on a surface of the substrate and wall surfaces of the through holes.

BRIEF DESCRIPTION OF THE DRAWINGS

FIG. 1 is a plan view of an electron-emitting source according to the first embodiment of the present invention;

DESCRIPTION OF THE PREFERRED EMBODIMENTS

The present invention will be described in detail with reference to the accompanying drawings.

Figure 1A:
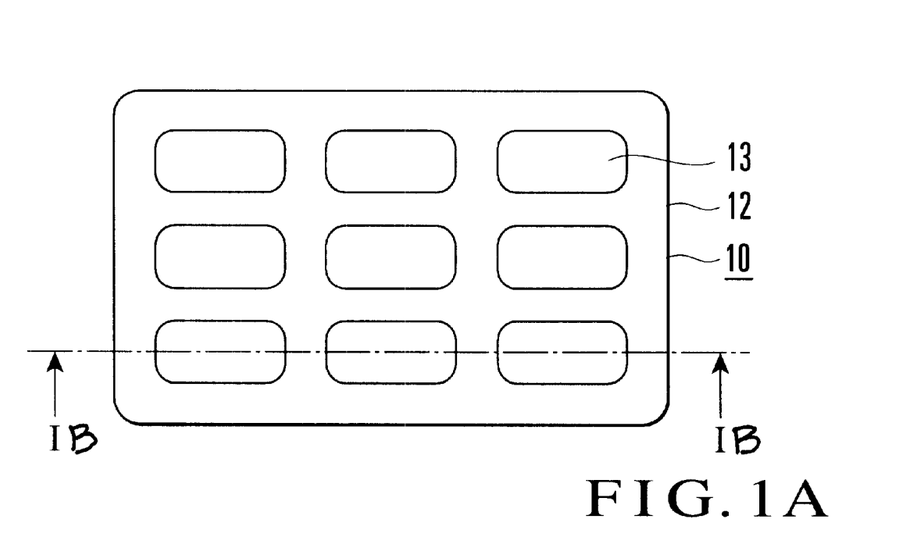
Figure 1B:
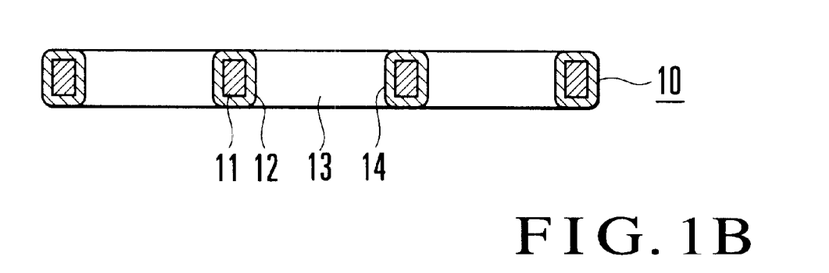
FIG. 1B is a sectional view taken along the line IB—IB of the electron-emitting source shown in FIG. 1A.

FIGS. 1A and 1B show an electron-emitting source according to the first embodiment of the present invention. As shown in FIG. 1A, an electron-emitting source 10 has a grid-like substrate (to be referred to as a substrate hereinafter) 11 made of a metal serving as a growth nucleus for nanotube fibers as the main component and having a large number of through holes 13, and a coating film 12 constituted by nanotube fibers covering the surface (exposed surface) of a metal grid portion made up of the surface of the substrate 11 and wall surfaces 14 of the through holes 13.

The substrate 11 is made of iron or an iron-containing alloy and has a thickness of 0.05 mm to 0.20 mm. The square through holes 13 with widths of 0.05 mm to 0.2 mm are arranged in a matrix to form the grid-like substrate 11. The arrangement of the through holes 13 is not limited to this, but can be of any type as far as the distribution of the coating film 12 becomes uniform on the substrate 11. The shapes of the openings of the through holes 13 are not limited to squares, and the sizes of the openings of the through holes 13 need not be equal.

For example, the openings of the through holes 13 may be polygons such as triangles, quadrangles, or hexagons, those formed by rounding the corners of such polygons, or circles or ellipses. The longitudinal sectional shape of the metal portion of the substrate 11 is not limited to a square as shown in FIG. 1B, but may be any shape such as a circle or ellipse constituted by curves, a polygon such as a triangle, quadrangle, or hexagon, or those formed by rounding the corners of such polygons. Although the thickness of the substrate 11 is 0.05 mm to 0.20 mm and the openings of the through holes 13 have widths of about 0.05 mm to 0.20 mm, the present invention is not limited to them.

The nanotube fibers constituting the coating film 12 have thicknesses of about 10 nm or more and less than 1 $\mu$m and lengths of 1 $\mu$m or more and 100 $\mu$m or less, and are made of carbon. The nanotube fibers suffice if they are single-layered carbon nanotubes in each of which a graphite single layer is cylindrically closed and a 5-membered ring is formed at the distal end of the cylinder. Alternatively, the nanotube fibers may be coaxial multilayered carbon nanotubes in each of which a plurality of graphite layers are multilayered to form a telescopic structure and are respectively cylindrically closed, hollow graphite tubes each with a disordered structure to produce a defect, or graphite tubes filled with carbon. Alternatively, the nanotubes may mixedly have these structures.

Figure 2:
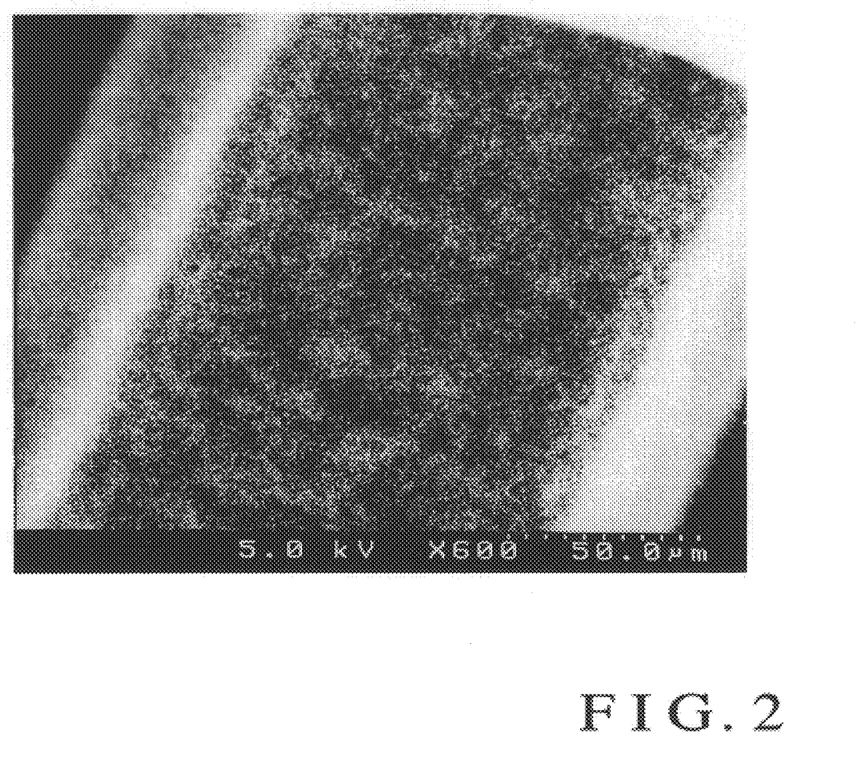
FIG. 2 is an electron micrograph of a coating film formed on the substrate of the electron-emitting source shown in FIGS. 1A and 1B.
Figure 3:
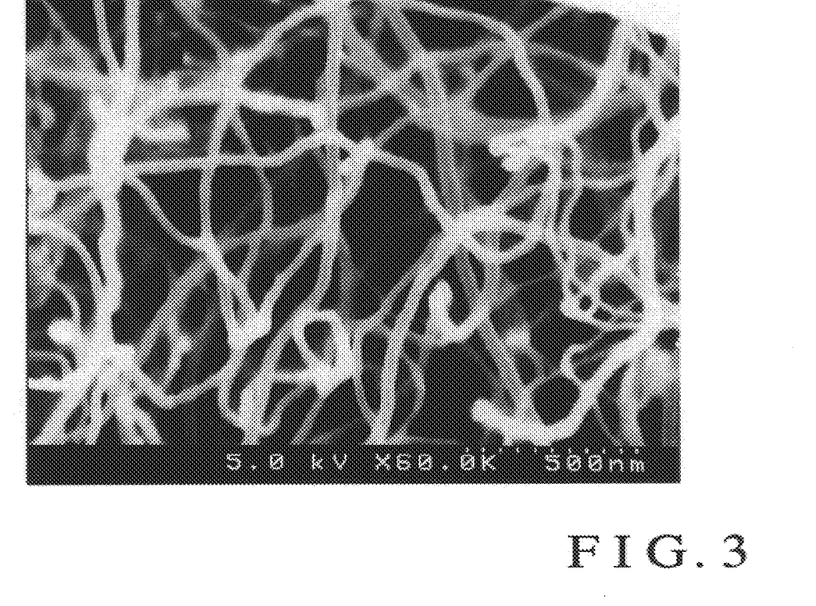
FIG. 3 is an enlarged electron micrograph of the coating film formed on the substrate of the electron-emitting source shown in FIGS. 1A and 1B.

Each nanotube fiber described above has one end connected to the surface of the substrate 11 or the wall surfaces 14 of the through holes 13 and is curled or entangled with other nanotube fibers, as shown in FIGS. 2 and 3, to cover the surface of the metal portion constituting the grid, thereby forming the cotton-like coating film 12. The coating film 12 covers the surface of the substrate 11 with the thickness of 0.05 mm to 0.20 mm by a thickness of 10 $\mu$m and to 30 $\mu$m to form a smooth curved surface. FIGS. 2 and 3 show electron micrographs, in which the coating film 12 covering the substrate 11 is enlarged by 600 times and 60,000 times, respectively.

Figure 4:
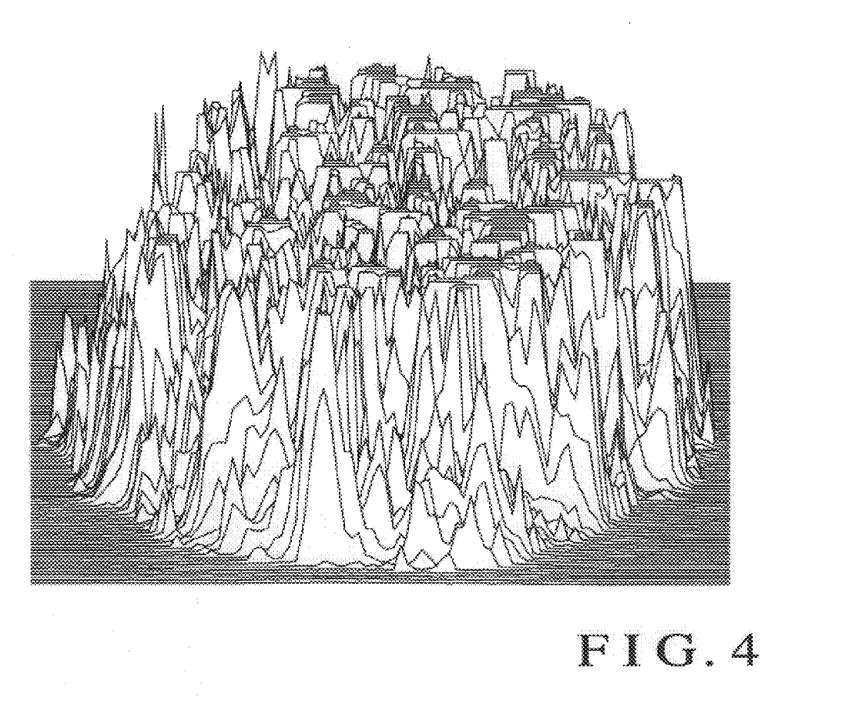
FIG. 4 is a graph showing the distribution of the electron-emitting density of the electron-emitting source shown in FIGS. 1A and 1B.
Figure 5:
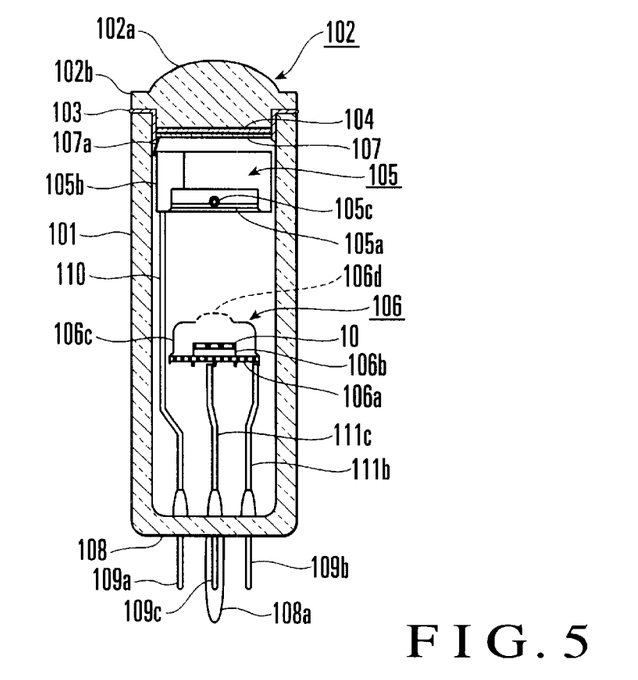
FIG. 5 is a longitudinal sectional view of a vacuum fluorescent display to which the electron-emitting source shown in FIGS. 1A and 1B is applied.

The electron emission uniformity of the electron-emitting source with this arrangement will be described with reference to FIG. 4. In FIG. 4, the electron emission uniformity of a cathode assembly 106 of a vacuum fluorescent display shown in FIG. 5 is indicated by current densities at measurement points plotted every 40-$\mu$m interval in both the X and Y directions. The range of the current density shown in this graph is 0 mA/cm$^2$ to 15 mA/cm$^2$. The uniformity of electron-emitting density shown in FIG. 4 corresponds to that of a hot cathode formed of a conventional filament coated with an oxide. This verifies the effectiveness of the electron-emitting source of the present invention.

As shown in FIG. 5, the cathode assembly 106 used in this measurement is comprised of a ceramic substrate 106a, a substrate electrode 106b formed of a rectangular parallelepiped stainless steel cap mounted at the central portion on the ceramic substrate 106a, an electron-emitting source 10 placed on the substrate electrode 106b, and a rectangular parallelepiped stainless steel grid housing 106c fixed to the ceramic substrate 106a to cover the substrate electrode 106b and electron-emitting source 10. The grid housing 106c has a dome-shaped mesh grid 106d with a major axis of 6 mm and a minor axis of 4 mm at the central portion of its upper surface opposing the electron-emitting source 10.

In this arrangement, when a high voltage is applied across the substrate electrode 106b and grid housing 106c of the cathode assembly 106 placed in vacuum, electrons extracted from the electron-emitting source 10 are emitted through the mesh grid 106d of the grid housing 106c which opposes the electron-emitting source 10.

The electron-emitting source 10 is spot-welded to the substrate electrode 106b serving as a cathode, and the distance between the electron-emitting source 10 and mesh grid 106d is set to 0.4 mm. The mesh grid 106d is constituted by a large number of 20-$\mu$m diameter through holes. This measurement was performed by placing the cathode assembly 106 in vacuum of $1.1 \times 10^{-6}$ Pa, setting the substrate electrode 106b at 0 V, and applying a positive voltage of 2,950 V with a pulse width of 150 $\mu$sec and a frequency of 100 Hz to the grid housing 106c.

The vacuum fluorescent display used for measuring the uniformity of electron emission of the electron-emitting source described above will be described. In the vacuum fluorescent display to which the electron-emitting source of the present invention is applied, as shown in FIG. 5, a face glass member 102 is fixed to a cylindrical glass bulb 101 by adhesion with low-melting frit glass 103 to form a vacuum vessel (envelope). A phosphor screen 104, an anode electrode assembly 105, and the cathode assembly 106 which forms an electron-emitting portion are arranged in this vacuum vessel.

The face glass member 102 has a convex lens-like spherical portion 102a at the central portion of its front surface, and a flange-like step portion 102b at its periphery. The inner surface of the face glass member 102 is coated with a $Y_2O_2S:Tb+Y_2O_3:Eu$ phosphor mixture, which emits white light, to form the phosphor screen 104. An Al metal-back film 107 with a thickness of about 150 nm is formed on the surface of the phosphor screen 104. The inner peripheral portion of the face glass member 102 partly forms a recess (not shown). In this recess the phosphor screen 104 is not formed but only the Al metal-back film 107 is formed.

One end of an elastic stainless steel contact piece 107a is inserted in this recess, and is fixed to the Al metal-back film 107 by adhesion with a conductive adhesive material made of a mixture of carbon or silver and frit glass. The other end of the contact piece 107a extends toward the inner wall surface of the glass bulb 101. The face glass member 102 is fitted in the opening of the glass bulb 101, with a diameter of about 20 mm and a length of about 50 mm, with its flange-like step portion 102b, and is fixed there by adhesion with low-melting frit glass 103.

The bottom of the glass bulb 101 is comprised of a glass stem 108 integrally formed with an exhaust pipe 108a, and lead pins 109a to 109c are inserted in the glass stem 108. An anode lead 110 has one end fixed to the inner distal end of the lead pin 109a by welding, and the other end fixed to the cylindrical anode electrode assembly (electron accelerating electrode) 105, fixed to the upper portion of the glass bulb 101, by welding.

The anode electrode assembly 105 is comprised of a ring-like anode 105a molded by rounding a metal wire made of stainless steel and having a wire diameter of about 0.5 mm into a ring shape, and a cylindrical anode 105b formed by winding a rectangular stainless steel plate with a thickness of 0.01 mm to 0.02 mm on the outer circumferential surface of the ring-like anode 105a and welding its overlapping portions at two points by welding.

One end of the contact piece 107a is fixed to the Al metal-back film 107. The other end of the contact piece 107a is in contact with the outer surface of the cylindrical anode 105b. The ring-like anode 105a is welded to the distal end of the anode lead 110 at a predetermined portion, and the cylindrical anode 105b is welded to the most distal end of the anode lead 110 at its inner side. A Ba getter 105c is attached to part of the ring-like anode 105a by welding.

Each of cathode leads 111b and 111c has one end fixed to the inner distal end of the corresponding one of the lead pins 109b and 109c by welding, and the other end fixed to a corresponding predetermined portion of the cathode assembly 106 by welding. More specifically, the cap-like substrate electrode 106b constituting the cathode assembly 106 is attached to the ceramic substrate 106a by twisting its leg (not shown) projecting downward from the ceramic substrate 106a through a through hole formed in the ceramic substrate 106a. The leg of the substrate electrode 106b is welded to the other end of the cathode lead 111c. The other end of the cathode lead 111b is welded to the grid housing 106c constituting the cathode assembly 106.

FIG. 5 does not show the sections of the anode electrode assembly 105, anode lead 110, cathode leads 111b and 111c, lead pins 109a to 109c, and exhaust pipe 108a.

The operation of the vacuum fluorescent display with the above arrangement will be described.

First, an external circuit supplies a voltage to the lead pins 109b and 109c to apply a high voltage across the substrate electrode 106b and grid housing 106c through the cathode leads 111b and 111c. Thus, an electric field is uniformly applied to the nanotube fibers constituting the coating film 12 of the electron-emitting source 10 placed on the substrate electrode 106b, so that electrons are extracted from the nanotube fibers and emitted from the mesh grid 106d of the grid housing 106c.

Simultaneously, the external circuit applies a high voltage to the lead pin 109a to apply a high voltage to the Al metal-back film 107 via the anode lead 110→anode electrode assembly 105 (cylindrical anode 105b)→contact piece 107a. The electrons emitted from the mesh grid 106d are accelerated by the cylindrical anode 105b to bombard against the phosphor screen 104 through the Al metal-back film 107. As a result, the phosphor screen 104 is excited by electron bombardment, and emits light in a color corresponding to the phosphor that makes up the phosphor screen 104. The light produced by the phosphor screen 104 is transmitted through the face glass member 102 and emitted from the spherical portion 102a on the front side to perform indication by light emission.

In the above description, the electron-emitting source is applied to a cylindrical vacuum fluorescent display. However, the present invention is not limited to this, but the electron-emitting source can also be used as an electron source for a flat vacuum fluorescent display or FED. In this case, the substrate size may be increased, and a plurality of substrates of the same size may be mounted. When displaying a fixed pattern, the substrate shape may be changed in accordance with a desired pattern. When the substrate size is increased, the display surface area can increase with a small number of electron-emitting sources, leading to a reduction in the production cost. When a plurality of substrates are mounted or the substrate shape is changed in accordance with the pattern, a voltage may be applied to only necessary electrodes to eliminate unnecessary electron emission, leading to a reduction in power consumption.

According to this embodiment, since the grid-like substrate constituting the electron-emitting source is covered with curled or entangled nanotube fibers to smooth its surface, the electric field is applied uniformly. When this grid-like substrate is used to form the electron source of a fluorescent display device, field electrons are emitted not from a particular portion of the nanotube fibers but uniformly from the nanotube fibers. As a result, the distribution of light-emitting density of the phosphor screen caused by electron irradiation becomes very uniform, thereby improving the display quality.

Also, the density of electron irradiation of the phosphor screen for obtaining the same luminance as that in the conventional case can be uniformly suppressed Low. As a result, an early degradation of the light-emitting efficiency at a portion where the irradiating current is excessively large, which poses a problem when electron irradiation is nonuniform, does not occur, and long-life, highly efficient, and high-quality surface emission can be obtained.

A method of manufacturing the electron-emitting source described above will be described.

The substrate 11 will be described first. Preferably, the material to form the substrate 11 is conductive and contains a material that serves as a catalyst for generating nanotube fibers. Those that satisfy these conditions include one element selected from iron, nickel, and cobalt, or an alloy containing at least one element selected from iron, nickel, and cobalt. When thermal CVD (Chemical Vapor Deposition) to be described later is used, the nanotube fiber coating film 12 made of carbon is formed only when the underlying metal is made of iron or an iron-containing alloy. Hence, iron or an iron-containing alloy is used.

When iron is selected, industrial pure iron (Fe with a purity of 99.96%) is used. This purity is not specifically defined, but can be, e.g., 97% or 99.9%. As the iron-containing alloy, for example, stainless steel such as SUS304, a 42 alloy, or a 42-6 alloy can be used. However, the present invention is not limited to them. In this embodiment, a 42-6 alloy thin plate with a thickness of 0.05 mm to 0.20 mm was used considering the manufacturing cost and availability.

How to form the substrate 11 into a grid shape will be described. The grid-like substrate 11 is fabricated by general photoetching. First, a photosensitive resist film is formed on an iron or ion-containing alloy thin plate, exposed with light or ultraviolet rays by using a mask with a desired pattern, and developed, thereby forming a resist film with a desired pattern. Then, this thin plate is dipped in an etching solution to remove its unnecessary portions. After that, the resist film is removed, and the thin plate is washed.

In this case, if a pattern is formed on the resist film on one surface of the thin plate while leaving the resist film on the other surface intact, the sectional shape of the metal portion constituting the grid becomes trapezoidal or triangular. If patterns are formed on the resist films on the two surfaces, the sectional shape becomes hexagonal or rhombic. The sectional shape changes in this manner in accordance with the manufacturing methods and manufacturing conditions, and can be of any shape. After etching, electropolishing may be performed to obtain a curved section.

Figure 6:
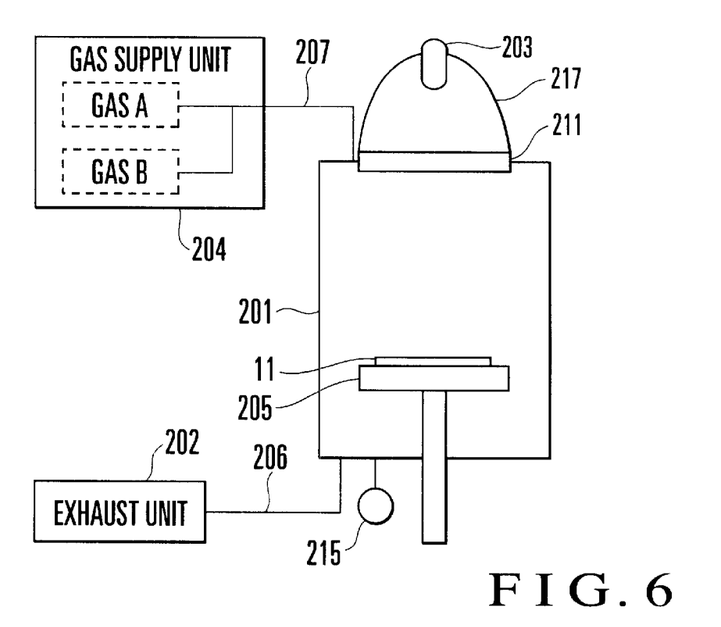
FIG. 6 is a diagram showing the schematic arrangement of a manufacturing apparatus used for forming the coating film of the electron-emitting source shown in FIGS. 1A and 1B.

How to form the coating film 12 will be described. According to this method, the nanotube fiber coating film 12 is formed on the substrate 11 by thermal CVD. First, a thermal CVD apparatus for forming the coating film 12 will be described. This thermal CVD apparatus is an atmospheric pressure CVD apparatus employing infrared lamp heating, and has a reaction vessel 201, exhaust unit 202, infrared lamp 203, and gas supply unit 204, as shown in FIG. 6.

The reaction vessel 201 is a pressure vessel that can be vacuum-evacuated, and is connected to the gas supply unit 204 through a gas inlet pipe 207, and to the exhaust unit 202 through an exhaust pipe 206. A substrate holder 205 for placing the substrate 11 thereon is set in the reaction vessel 201. The upper surface of the reaction vessel 201 which opposes the substrate holder 205 has a quartz window 211 using a quartz plate, and the infrared lamp 203 is arranged outside the quartz window 211. A pressure sensor 215 is attached to the reaction vessel 201 to measure the pressure in the reaction vessel 201.

The exhaust unit 202 has a vacuum pump (not shown) and a bypass pipe for bypassing the vacuum pump. The exhaust unit 202 vacuum-evacuates the interior of the reaction vessel 201 with the vacuum pump before and after the process to purge unnecessary gases, and discharges the material gas, during the process, through the bypass pipe. An outer air should not enter the exhaust unit 202 through the exhaust port, and the discharged material gas must be made harmless, as a matter of course.

The infrared lamp 203 is attached to the upper portion of the reaction vessel 201 together with a reflecting mirror 217, and infrared rays from the infrared lamp 203 irradiate the substrate 11 through the quartz window 211, thereby heating the substrate 11. A temperature sensor (not shown) for measuring the temperature of the substrate 11 is attached to the substrate holder 205, and is used for temperature control of the substrate 11. The gas supply unit 204 can supply a plurality of gases (gases A and B) independently of each other at predetermined flow rates, and mixes them and introduces the gas mixture to the reaction vessel 201.

How to form the coating film 12 by using the thermal CVD apparatus with this arrangement will be described.

Methane and hydrogen are used as the carbon introducing gas and growth promoting gas, respectively. Hence, preparation is performed so that the gas supply unit 204 of the thermal CVD apparatus can supply methane and hydrogen. Subsequently, the substrate 11 is set on the substrate holder 205, and the interior of the reaction vessel 201 is vacuum-evacuated to a pressure of about 1 Pa by the exhaust unit 202.

The infrared lamp 203 is turned on to heat the substrate 11 and keep it stabilized at a predetermined temperature. A gas mixture formed by mixing hydrogen gas and methane gas at a predetermined ratio is introduced from the gas supply unit 204 into the reaction vessel 201. With the gas mixture being supplied, the interior of the reaction vessel 201 is maintained at 1 atm for a predetermined period of time to grow the nanotube fiber coating film 12 on the surface of the substrate 11 and the wall surface of the metal portion (wall surfaces 14 of the through holes 13) constituting the grid. In forming the coating film 12, the substrate 11 is heated to 850° C., the methane gas and hydrogen gas are supplied, such that the methane gas concentration is 30%, and the interior of the reaction vessel 201 is maintained at 1 atm. This state is maintained for 60 min.

When a predetermined period of time has elapsed, supply of the hydrogen gas and methane gas is stopped, the infrared lamp 203 is turned off, and the interior of the reaction vessel 201 is vacuum-evacuated to a pressure of about 1 Pa. The interior of the reaction vessel 201 is then restored to the atmospheric pressure, and the substrate 11 formed with the nanotube fiber coating film 12 is removed. By this process, nanotube fibers grow from the surface of the substrate 11 and the wall surface of the metal portion (wall surfaces 14 of the through holes 13) constituting the grid like curled ropes, and the coating film 12 with a smooth surface formed of the nanotube fibers is formed.

According to this method, a field emission type electron-emitting source free from a discontinuous portion such as a projection or recess, where an electric field is concentrated to cause local electron emission, can be formed. Therefore, an electron-emitting source that can obtain uniform field emission with a high current density and does not easily cause breakdown due to local field concentration can be manufactured.

Although methane gas is used as the carbon introducing gas, the present invention is not limited to this, and other gases containing carbon may be used. For example, carbon monoxide may be used as the carbon introducing gas. In this case, the substrate 11 may be heated to 650° C., carbon monoxide and hydrogen gas may be supplied such that the concentration of carbon monoxide is 30%, and the interior of the reaction vessel 201 may be maintained at 1 atm. This state may be maintained for 30 min. Alternatively, carbon dioxide may be used as the carbon introducing gas. In this case, the substrate 11 may be heated to 650° C., carbon dioxide and hydrogen gas may be supplied such that the concentration of carbon dioxide is 30%, and the interior of the reaction vessel 201 may be maintained at 1 atm. This state may be maintained for 30 min.

An electron-emitting source according to the second embodiment of the present invention will be described.

Figure 7:
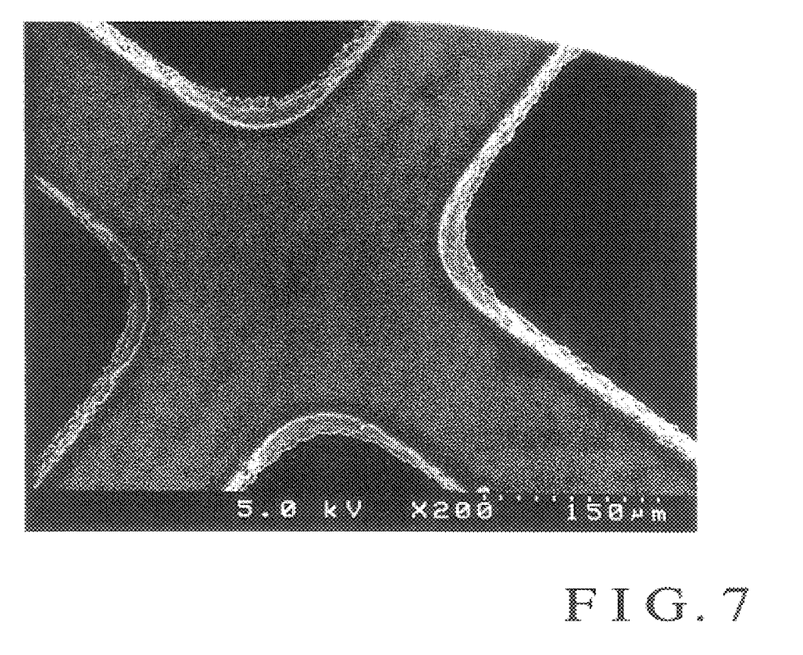
FIG. 7 is an electron micrograph of a coating film formed on the surface of a substrate constituting an electron-emitting source according to the second embodiment of the present invention.
Figure 8:
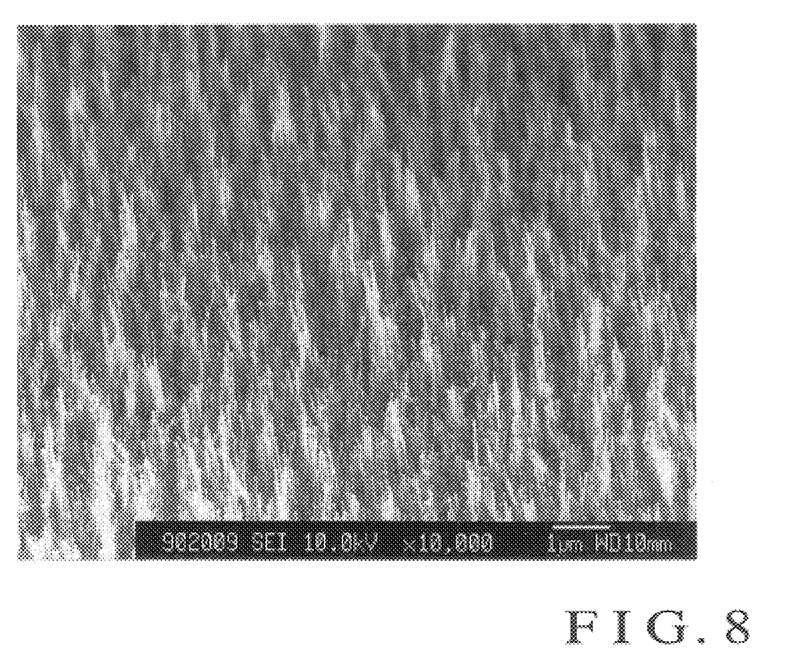
FIG. 8 is an electron micrograph to show the shapes of nanotube fibers shown in FIG. 7.

The electron-emitting source of this embodiment is comprised of a substrate 11, and a carbon nanotube fiber coating film 12 covering a metal portion which forms a grid, in the same manner as in the first embodiment shown in FIGS. 1A and 1B. The second embodiment is different from the first embodiment in that the substrate 11 is made of one element selected from iron, nickel, and cobalt, or of an alloy containing at least one element selected from iron, nickel, and cobalt, and in that the nanotube fibers constituting the coating film 12 are not curled but extend substantially perpendicularly from the surface of the substrate 11 and the wall surface of the metal portion that forms the grid, as shown in FIGS. 7 and 8. To extend perpendicularly means to extend upward from the upper surface of the metal portion, downward from the lower surface of the metal portion, and horizontally from the side surface of the metal portion when taking the metal portion constituting the grid as an example.

FIG. 7 shows an electron micrograph with a magnification of 200 times by photographing the surface of the substrate 11 covered with the nanotube fibers from above. Since the nanotube fibers are formed substantially perpendicularly upward from the surface of the substrate 11, they look like white spots in FIG. 7. FIG. 8 shows an electron micrograph with a magnification of 10,000 times by photographing the surface of the substrate 11 covered with the nanotube fibers from obliquely above. FIG. 8 shows that the surface of the substrate 11 is covered with the coating film 12 of substantially perpendicular nanotube fibers.

According to this embodiment, the nanotube fibers are formed substantially perpendicularly from the surface of the substrate 11. When a high voltage is applied across the nanotube fibers and the electrode opposing the substrate 11, the electric field is concentrated to the distal ends of the nanotube fibers, and electrons are field-emitted from the distal ends of the nanotube fibers. In this case, since the nanotube fibers grow uniformly around the metal portion that forms the grid, the surface of the electron-emitting source is formed smooth. As a result, uniform field electron emission can be obtained with a high current density, and breakdown due to local field concentration does not occur easily. Also, since the electron-emitting portion forms a grid, even if breakdown should occur due to local field concentration, it does not easily lead to a breakdown chain.

In this embodiment as well, the arrangement of through holes 13, the shapes of the openings of the through holes 13, and the sectional shape of the grid portion of the substrate 11 are not limited to those shown in FIGS. 7 and 8. The coating film 12 suffices if it is a film with a thickness of about 10 $\mu$m to 30 $\mu$m formed of carbon nanotube fibers each with a thickness of about 10 nm or more and 1 $\mu$m or less.

A method of manufacturing the electron-emitting source described above will be described. According to this method, the carbon nanotube fiber coating film 12 is formed on the substrate 11 by microwave plasma CVD, thereby manufacturing an electron-emitting source. With microwave plasma CVD, formation of the nanotube fiber coating film 12 is not limited to only when the substrate 11 is made of iron or an iron-containing alloy. Any material can be used as far as it is one element selected from iron, nickel, and cobalt, or an alloy containing at least one element selected from iron, nickel, and cobalt. In this embodiment, a 42-6 alloy thin plate with a thickness of 0.05 mm to 0.20 mm was used considering the manufacturing cost and availability, in the same manner as in the first embodiment. A method of fabricating the substrate 11 using the above metal is the same as that described in the first embodiment, and a detailed description thereof will accordingly be omitted.

Figure 9:
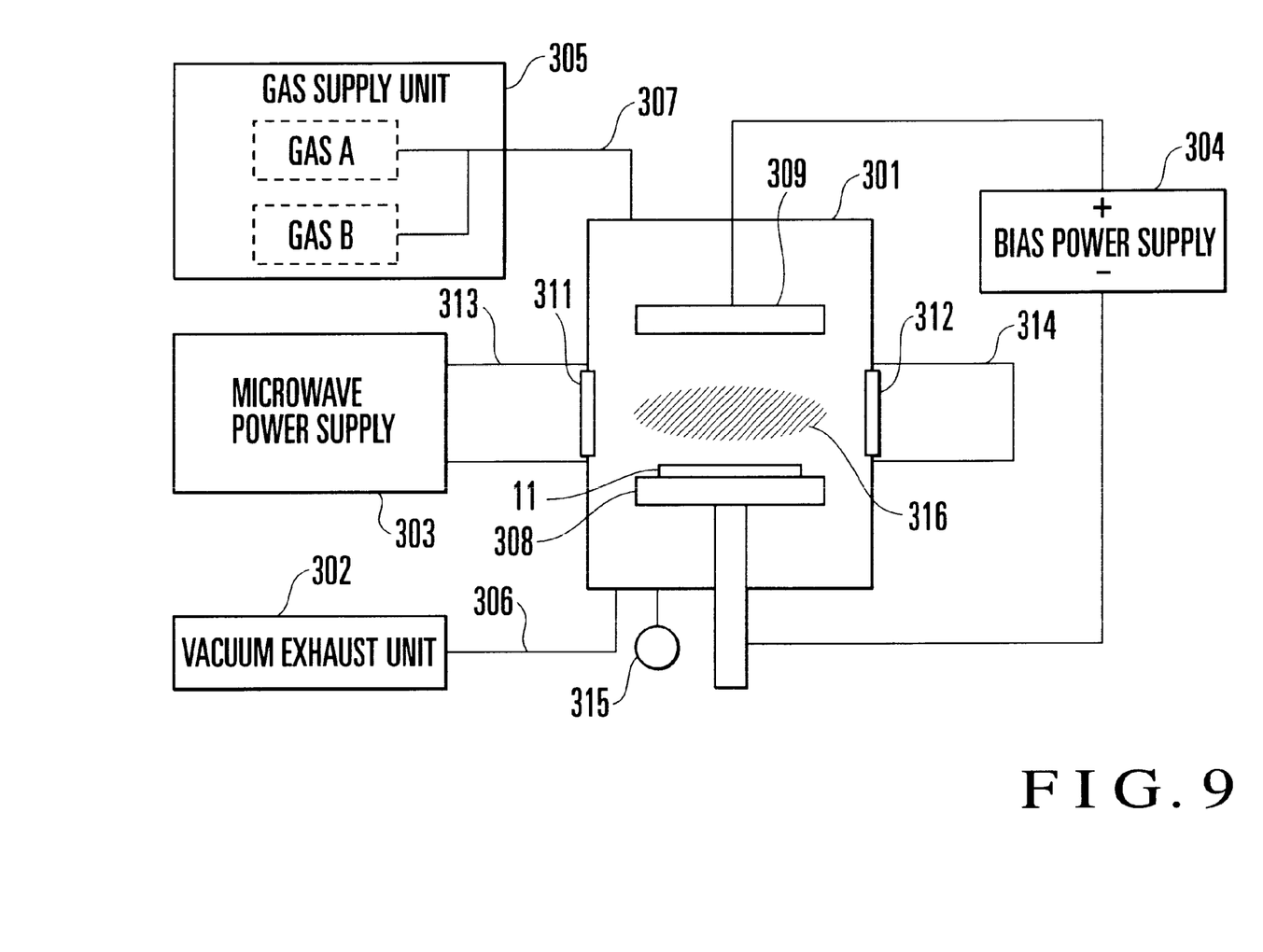
FIG. 9 is a diagram showing the schematic arrangement of a manufacturing apparatus used for forming the coating film of the electron-emitting source according to the second embodiment.

How to form the coating film 12 will be described. According to this method, the nanotube fiber coating film 12 is formed on the substrate 11 by microwave plasma CVD. First, a microwave plasma CVD apparatus for forming the coating film 12 will be described. This microwave plasma CVD apparatus has a reaction vessel 301, vacuum exhaust unit 302, microwave power supply 303, bias power supply 304, and gas supply unit 305, as shown in FIG. 9.

A lower electrode 308 and upper electrode 309 are arranged at a predetermined gap to be parallel to each other in the reaction vessel 301 made of a metal. The lower and upper electrodes 308 and 309 are connected to the negative and positive sides, respectively, of the bias power supply 304. A pair of opposing quartz windows 311 and 312 using quartz plates are provided to the side walls of the reaction vessel 301 at positions as extensions of a region sandwiched by the lower and upper electrodes 308 and 309. The outer side of the quartz window 311 is connected to the microwave power supply 303 through a waveguide 313, and the outer side of the quartz window 312 is attached with a waveguide 314 with one closed end.

The reaction vessel 301 is connected to the vacuum exhaust unit 302 through an exhaust pipe 306, and its interior is vacuum-evacuated by the vacuum exhaust unit 302. The reaction vessel 301 is also connected to the gas supply unit 305 through a gas inlet pipe 307, and a gas supplied from the gas supply unit 305 is introduced into the vacuum-evacuated reaction vessel 301. A pressure sensor 315 is attached to the reaction vessel 301 to measure the pressure in the reaction vessel 301.

The vacuum exhaust unit 302 exhausts the gas supplied from the gas supply unit 305 to set the interior of the reaction vessel 301 at a predetermined pressure. The microwave power supply 303 outputs a 2.45-GHz frequency microwave at a preset power, thereby supplying a microwave power into the reaction vessel 301 through the waveguide 313. The bias power supply 304 outputs a preset DC voltage to the lower and upper electrodes 308 and 309 to generate a parallel electric field with the lower electrode 308 being set as the negative side. The gas supply unit 305 supplies a plurality of gases A and B independently at predetermined flow rates, mixes these gases, and supplies a gas mixture into the reaction vessel 301.

How to form the coating film 12 by using the microwave plasma CVD apparatus with this arrangement will be described. Methane and hydrogen are used as the carbon introducing gas and growth promoting gas, respectively. Hence, preparation is performed so that the gas supply unit 305 of the plasma CVD apparatus can supply methane (gas A) and hydrogen (gas B). Subsequently, the substrate 11 is set on the lower electrode 308 of the plasma CVD apparatus, and the interior of the reaction vessel 301 is vacuum-evacuated to a predetermined pressure by the vacuum exhaust unit 302.

The gas supply unit 305 introduces hydrogen gas into the reaction vessel 301, and the microwave power supply 303 supplies a microwave power into the reaction vessel 301, thereby generating a plasma 316. Simultaneously, the bias power supply 304 outputs a DC voltage to apply a bias voltage to the upper and lower electrodes 309 and 308, thereby generating a parallel electric field with the lower electrode 308 being the negative side. The surface of the substrate 11 is cleaned and activated by ion bombardment. This process is performed for 15 min with a microwave power of 500 W, a bias voltage of 150 V, and a pressure of 1,000 PA. Although cleaning and activation of the surface of the substrate 11 are not indispensable, they are preferably performed as they improve the electron-emitting characteristics of the nanotube fibers to be generated.

Then, the gas supply unit 305 introduces methane gas and hydrogen gas into the reaction vessel 301 with a predetermined ratio, and the microwave power supply 303 supplies a microwave power into the reaction vessel 301, thereby generating a plasma 316. Simultaneously, the bias power supply 304 outputs a DC voltage to apply a bias voltage to the upper and lower electrodes 309 and 308, thereby generating a parallel electric field with the lower electrode 308 being the negative side. As a result, the nanotube fiber coating film 12 is grown on the surface of the substrate 11 and on the wall surface of the metal portion (wall surfaces 14 of through holes 13) that constitutes the grid.

The process for forming the coating film 12 is performed for 30 min with a microwave power of 500 W, a bias voltage of 250 V, a pressure of 200 Pa to 2,000 PA, and a methane gas concentration of 20%. At this time, the substrate 11 is heated by the microwave to reach a temperature of 500° C. to 650° C. If the bias voltage is not applied, no nanotube fibers may be formed, and a graphite coating film may be formed undesirably. Therefore, application of the bias voltage is indispensable.

After the process, the interior of the reaction vessel 301 is vacuum-evacuated to a predetermined pressure, and the material gas is exhausted. After that, the interior of the reaction vessel 301 is restored to the atmospheric pressure, and the substrate 11 formed with the nanotube fiber coating film 12 is removed from the reaction vessel 301. By this process, carbon nanotube fibers grow substantially perpendicularly from the surface of the substrate 11 and the wall surface of the metal portion that forms the grid, so that the coating film 12 with the smooth surface constituted by the nanotube fibers is formed. As a result, a field emission type electron-emitting source which does not easily cause local electron emission can be formed.

In the above description, methane gas is used as the carbon introducing gas. However, the present invention is not limited to this, and other carbon-containing gases may be used. For example, acetylene gas may be used as the carbon introducing gas. In this case, the ratio of the acetylene gas and hydrogen gas is set such that the acetylene gas concentration becomes 30%. Except for this, the same conditions as those for the above case using methane gas may be employed. The gas used for cleaning and activating the surface of the substrate 11 is not limited to hydrogen gas, and a rare gas such as helium or argon may be used.

As has been described above, according to the present invention, since the nanotube fibers cover the surface of the substrate and the wall surfaces of the through holes to form a smooth substrate surface, the electric field is applied to the surface uniformly. Hence, field emission electrons are emitted not locally but uniformly at the same level, so uniform field electron emission can be obtained with a high current density. Since local field concentration does not easily occur, even if the field strength is increased to improve the luminance, breakdown does not easily occur. Even if breakdown should occur, it does not easily lead to a breakdown chain since the electron-emitting portion forms a grid.

Since the nanotube fiber coating film can be formed on the substrate directly, the assembly step can be omitted from the manufacture, thus reducing the cost.

What is claimed is:

1. An electron-emitting source comprising:
   a substrate made of a material containing a metal serving as a growth nucleus for nanotube fibers as a main component and having a plurality of through holes; and
   a coating film constituted by nanotube fibers formed on a surface of said substrate and wall surfaces of the through holes.

2. A source according to claim 1, wherein the nanotube fibers constituting said coating film are made of carbon.

3. A source according to claim 1, wherein said substrate is made of either one of iron and an iron-containing alloy.

4. A source according to claim 1, wherein the nanotube fibers are curled to cover an exposed surface of said substrate.

5. A source according to claim 1, wherein said substrate is made of one element selected from the group consisting of iron, nickel, cobalt, and an alloy containing at least one element selected from iron, nickel, and cobalt.

6. A source according to claim 1, wherein the nanotube fibers extend substantially perpendicularly from the surface of said substrate and the wall surfaces of the through holes to cover an exposed surface of said substrate.

7. A source according to claim 1, wherein said substrate is formed into a grid shape with a large number of the through holes.

8. A source according to claim 1, wherein said coating film is formed to a thickness of 10 $\mu$m to 30 $\mu$m from the nanotube fibers each with a thickness of not less than 10 nm and less than 1 $\mu$m and a length of not less than 1 $\mu$m and less than 100 $\mu$m.

9. An electron-emitting module comprising:
   a substrate electrode;
   an electron-emitting source arranged on said substrate electrode in a vacuum atmosphere, said electron-emitting source including a substrate made of a material containing a metal serving as a growth nucleus for nanotube fibers as a main component and having a plurality of through holes, and a coating film constituted by the nanotube fibers formed on a surface of said substrate and wall surfaces of the through holes; and
   a grid housing which covers an outer surface of said electron-emitting source and across which a high voltage is applied to said substrate electrode.

10. A module according to claim 9, wherein
    said substrate of said electron-emitting source is made of either one of iron and an iron-containing alloy, and
    the nanotube fibers of said electron-emitting source are made of carbon and curled to cover an exposed surface of said substrate.

11. A module according to claim 9, wherein
    said substrate of said electron-emitting source is made of one element selected from the group consisting of iron, nickel, cobalt, and an alloy containing at least one element selected from iron, nickel, and cobalt, and
    the nanotube fibers of said electron-emitting source are made of carbon and extend substantially perpendicularly from the surface of said substrate and the wall surfaces of the through holes to cover an exposed surface of said substrate.

* * * * *

UNITED STATES PATENT AND TRADEMARK OFFICE
CERTIFICATE OF CORRECTION

PATENT NO.    : 6,522,055 B2
DATED         : February 18, 2003
INVENTOR(S)   : Uemura et al.

It is certified that error appears in the above-identified patent and that said Letters Patent is hereby corrected as shown below:

<u>Title page,</u>
Item [56], References Cited, OTHER PUBLICATIONS, please delete "Jemura" and insert -- Uemura --.

<u>Drawings,</u>
Line 1, please delete "FIG. 1" and insert -- FIG. 1A --.

Signed and Sealed this

First Day of June, 2004

JON W. DUDAS
*Acting Director of the United States Patent and Trademark Office*